United States Patent [19]

Nishiwaki

[11] Patent Number: 4,727,775

[45] Date of Patent: Mar. 1, 1988

[54] DRESSING DEVICE FOR TIP OF WELDING GUN

[75] Inventor: Toshihiro Nishiwaki, Kawasaki, Japan

[73] Assignee: Obara Corporation, Tokyo, Japan

[21] Appl. No.: 866,024

[22] Filed: May 21, 1986

[30] Foreign Application Priority Data

Dec. 21, 1985 [JP] Japan .................. 60-286902

[51] Int. Cl.$^4$ ............................................. B23K 11/30
[52] U.S. Cl. ............................................................ 76/1
[58] Field of Search ............................ 76/1, DIG. 5

[56] References Cited

FOREIGN PATENT DOCUMENTS 57-14274  3/1982  Japan .
57-54946  11/1982 Japan .
59-159280 9/1984  Japan .

OTHER PUBLICATIONS

Japanese Laid–Open Patent Publication No. 62-64482, published Mar. 23, 1987.

Primary Examiner—Roscoe V. Parker
Attorney, Agent, or Firm—Flynn, Thiel, Boutell & Tanis

[57] ABSTRACT

A dressing device for a tip of a welding gun comprising a base; a dresser body; a driving device movably provided on said base for moving said dresser body; a pneumatic on-off valve connected with said dresser body; a control switch interposed between said driving device and the dresser body for controlling said pneumatic on-off valve; an air motor for rotating blades of said dressing device; a timer circuit responsive to pressure at an inlet of said air motor; an air changeover valve for changing over air to be fed to said driving device disposed on said timer circuit; a quick return mechanism mounted on said driving device; and a pneumatic control valve connected with said quick return cylinders and furthermore connected with said timer circuit, a tip of the welding gun can be dressed while setting thereof, at a prescribed position, by use of the quick return mechanism controlled by the timer without using springs.

3 Claims, 6 Drawing Figures

DRESSING DEVICE FOR TIP OF WELDING GUN

BACKGROUND OF THE INVENTION

1. Field of the Invention

The present invention relates to a dressing device for dressing an electrode tip of a welding gun mounted on a resistance welding machine.

2. Description of the Prior Art

A tip serving as an electrode part of a welding gun is worn away as it is pressurized and conducted with a current for its repetitive welding. Accordingly, successive use exerts bad influences on welding strength. As a result, it is necessary to periodically dress the tip. Referring then to FIGS. 5 and 6, such a dressing device for automatically dressing a tip will be described.

A base 1 has a rod 3 supported thereon and adapted to penetrate a driving device 2, said rod 3 including a partition wall 4 mounted thereon for halving the interior of a chamber of the driving device 2. Springs 5, 6 are respectively disposed between both side walls of the driving device 2, and the partition wall 4. The driving device 2 is adapted to be movable relative to the base 1 along the rod 3.

When a changeover valve 7 is moved to a position (a) then pressurized air from a compressor (not shown) flows through the changeover valve 7 from pipes 8, 9 and enters into one chamber (left side) of the driving device 2 via a pipe 10, whereby air pressure in the left chamber of the driving device 2 is increased to cause the driving device to be moved to the left along the rod 3. The leftward movement compresses the spring 6. With the movement of the driving device 2, a dresser body 11 also moves leftwardly causing a blade thereon to move into close contact with one tip (such as the left tip 48 in FIG. 2.) which prevents further leftward movement of the dresser body 11. The driving device 2 is further moved leftwardly while leaving behind the dresser body 11 at its position of contact with the tip, and once a difference between the relative positions of the driving device 2 and the dresser body 11 reaches a prescribed value, then a switch 12 is operated to open an air on-off valve 13. Thus, the air flows through the pipe 8, a pipe 14 and the on-off valve 13, and is fed to an air motor disposed in the dresser body 11 from a pipe 15. The driving device 2 stops its leftward movement when the partition wall 4 makes close contact with a bush 16 of the right chamber.

The air motor disposed in the dresser body 11 begins to be rotated by the compressed air from the pipe 15 to rotate the dresser blade, and when the inlet pressure P of the air supplied to the air motor reaches a reference value, then a timer 17 starts its operation. Namely, the timer permits the air motor to be normally rotated for a desired time to dress the tip. After lapse of the desired time, the changeover valve 7 is changed over by the timer 17 to a neutral position (b) to make the pressure difference between both chambers equal, thereby allowing the driving device 2 to be first moved to the right by the spring 6 to reduce the relative positional difference between the driving device itself and the dresser body 11. Thus, the switch 12 is switched off to close the on-off valve 13 and thereby rotation of the dresser blade is stopped. Then, also the dresser body 11 is separated from the tip owing to the movement of the driving device to the right, and is moved in the same direction accompanied by the driving device, and finally both the dresser body and the driving device return to the original state. Hereupon, the timer 17 is also reset for allowing the driving device to be returned to the initial state.

Moreover, in dressing the other tip (such as the right tip 51 in FIG. 2), the changeover valve 7 is moved to position (c) so as to move the driving device to the right side.

However, the prior dressing device suffers from some drawbacks: As the compressed air is supplied from the changeover valve, for example as pressure in the left chamber is increased as shown in FIG. 6, the driving device 2 is moved to the left on the base 1 and thereby the spring 6 is compressed as described above. There are thereupon instances where reactions (i.e., the restoring forces) of both the springs are increased in proportion to the movement of the driving device, and hence further leftward movement of the driving device is made either more difficult or impossible. Even if the movement of the driving device is made possible, the pressing force against the tip is changed due to a difference between the positions of the tip and the dresser body depending on the movement of the dresser body (and the large or small influence of the reaction of the spring 6). Accordingly, there are some cases according to circumstances wherein cutting or dressing of the tip is insufficient or excessive.

SUMMARY OF THE INVENTION

In view of the drawbacks of the prior dressing device, it is an object of the present invention to provide a dressing device for a tip of a welding gun wherein said springs 5 and 6 are eliminated, and a quick return mechanism is provided to a for centering the base of the driving device, said mechanism comprising cylinders and piston rods provided in the driving device 2, with a pneumatic control valve connected with a quick return cylinder and connected with a timer circuit.

To achieve the above object, a tip dressing device for a welding gun according to the present invention allows a tip to be dressed to be disposed at a prescribed position, and with compressed air supplied from the changeover valve to the driving device 2, pressure in one chamber provided in the driving device 2 is increased and thereby the driving device 2 is moved to one side on the base 1. And the chip dressing device, upon the movement of the driving device described above, prevents the reaction of the spring from being produced since the springs 5, 6 in the driving device 2 have been already removed, and thus pressing force of the dresser body against the tip is kept constant at all times.

In addition, upon completing the dressing operation, the control valve is operated by the timer to supply compressed air to the quick return mechanism provided in the driving device 2, and thereby quick return piston rods are rapidly projected from the cylinder to return the whole of the driving device 2 to the center of the base before the next dressing operation is effected.

The above and other objects, features and advantages of the present invention will become more apparent from the following description and the accompanying drawings in which a preferred embodiment of the present invention is shown by way of illustrative example.

DESCRIPTION OF THE PREFERRED EMBODIMENT

Let us describe below an embodiment of a tip dressing device of a welding gun according to the present invention with reference to FIGS. 1 to 4.

A rod 3 which is provided on a fixed base 1 penetrates a driving device 2, and a partition wall 4 for dividing the interior chamber of the driving device 2 is mounted on the rod 3. The driving device 2 is movable on the base 1 along the rod 3.

Figure 4:
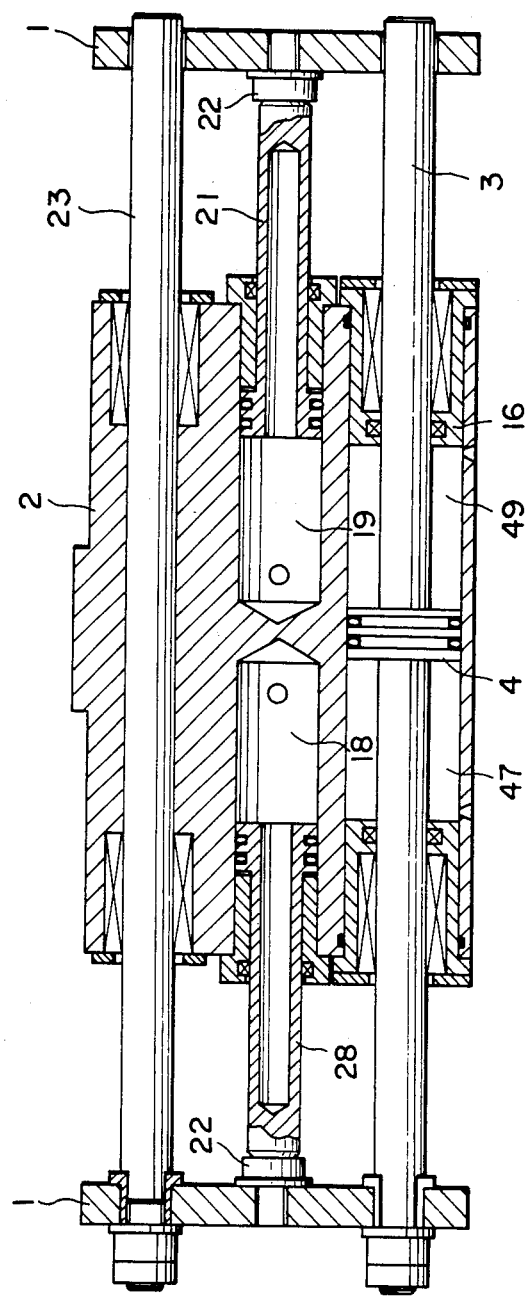
FIG. 4 is a cross sectional view of a portion of a driving device.
Figure 5:
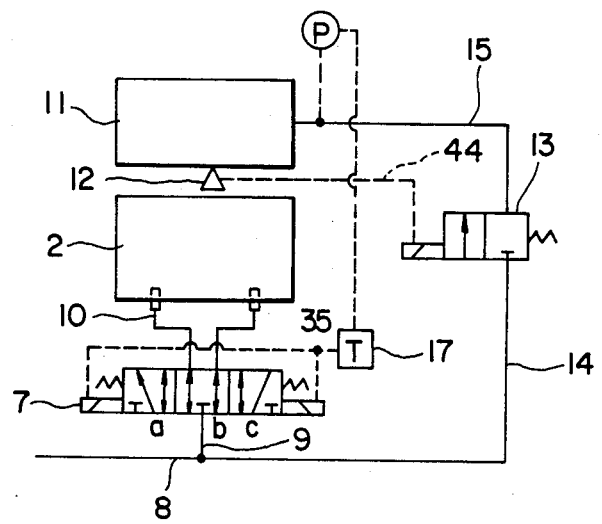
FIG. 5 is a schematic of a conventional air supply circuit and control circuit.
Figure 6:
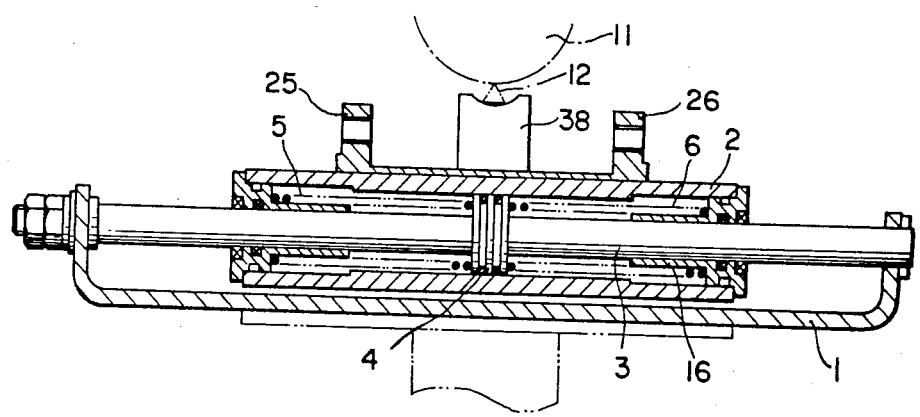
FIG. 6 is a cross sectional view of a portion of a driving device for the air supply circuit and control circuit of FIG. 5.

The driving device 2 has thereon a quick return mechanism comprising quick return cylinders 18, 19 and quick return piston rods 20, 21 (which are parallel to rod 3) for allowing the driving device 2 to return to its center position on the base as shown in FIG. 4. In addition, buffers 22 each made of rubber or a spring are provided on base 1 at prescribed positions thereof for engagement with the tips of the piston rods 20, 21.

Hereupon, a parallel guide rod 23 fixed to the base may be provided adjoining to the quick return mechanism so as to permit the whole of the driving device 2 to be properly movable on the base 1.

Figure 1:
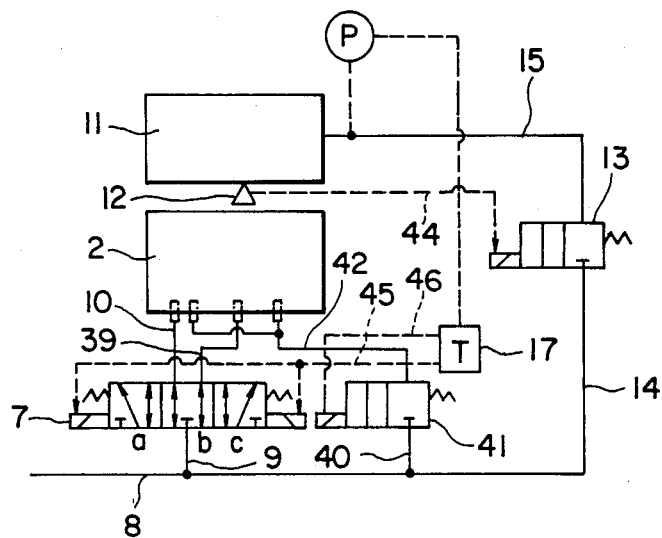
FIG. 1 is a schematic showing an air supply circuit and a control circuit of a dressing device according to the present invention.
Figure 2:
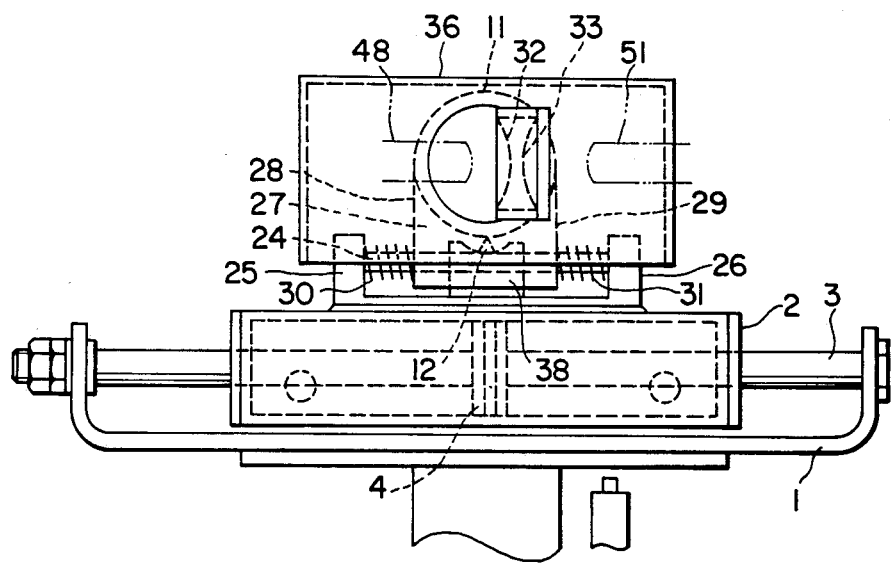
FIG. 2 is a front view of the dressing device according to the present invention.
Figure 3:
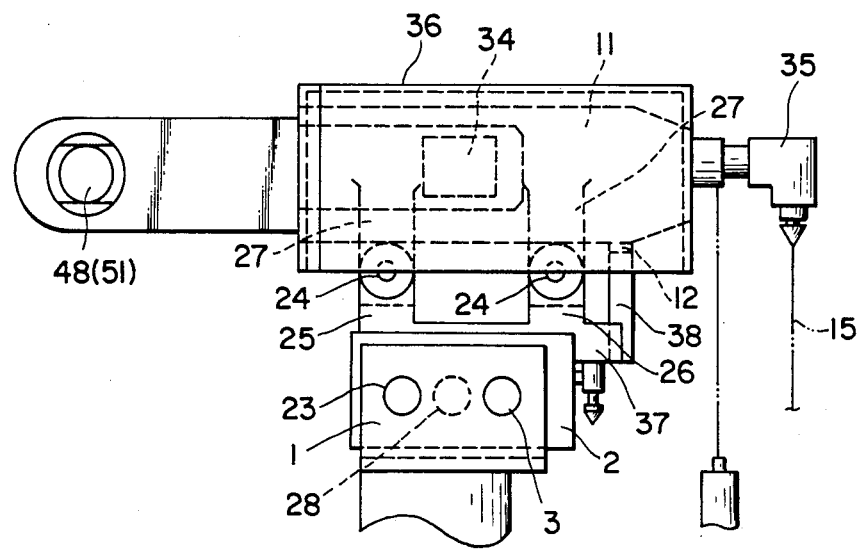
FIG. 3 is a side view of the same.

Furthermore, the driving device 2 has a pair of parallel guide rods 24 fixedly mounted thereon via both bosses 25, 26 for properly movably supporting the dresser body 11 as shown in FIG. 2, these rods 24 being parallel to rods 3 and 23. The guide rod 24 penetrates the boss 27 extending from the dresser body 11 and includes springs 30, 31 around the guide rod 24 between both sides 28, 29 of the boss 27 and bosses 25, 26 located on the sides of the driving device. The dresser body 11 includes oppositely-facing blades 32, 33, an air motor 34, a conventional transmission mechanism connected between the blades and air motor, and a connector 35 communicated with an air supply line 15 on the rear end thereof. The dresser body 11 is covered with a housing case 36. A boss 37 extends to the rear of the driving device 2. A switch holder member 38 extends toward the dresser body from the boss 37. A switch 12 is disposed between the the switch holder member and the dresser body.

The air supply circuit includes a pipe 8 branched from a compressor (not shown) toward an on-off valve 13 and a three-way changeover valve 7, pipes 10, 39 connected with right and left chambers of the driving device 2, a pipe 9 adapted to communicate with the pipes 10 or 39 via the changeover valve 7 or positioned at a neutral position, and a pipe 14 connected with the air motor 34 (FIG. 3) in the dresser body from a pipe 15 via the on-off valve 13. Moreover, a pipe 40 branches from the pipe 14 and is connected with a pipe 42 via a control valve 41, the pipe 42 being communicable with both cylinders 18, 19 of the quick return mechanism of the driving device 2.

In addition, control circuits 44, 45 and 46 are respectively disposed for controlling the on-off valve 13 between the switch 12 and the on-off valve 13, the timer 17 responsive to inlet pressure P of the air motor 34 for starting time measurement and the changeover valve 7, and between the timer 17 and the control valve 41.

With the changeover valve 7 is changed over to the position (a) as shown in the figure, air from the compressor (not shown) passes through the changeover valve 7 from the pipes 8, 9 and enters into one chamber 47 (left side) of the driving device via the pipe 10, and thereby pressure in the left chamber 47 of the driving device is increased to cause the driving device 2 to be moved to the left along the rod 3. This movement of the driving device 2 causes the dresser body to be also moved to the left since the dresser body is held by the guide rod 24 and the springs 30, 31.

Allowing the dresser blade 32 to be brought into contact with the left tip 48 due to the synchronous leftward movement of the driving device and dresser body, the dresser body is then prevented from being further moved to the left, but the tip 48 is properly positioned in contact with the blade 32 at that time. The further movement of the driving device to the left causes the dresser body to be left behind so that the right spring 31 is then compressed while the left spring 30 is elongated. With the relative positional difference between the driving device and the dresser body reaches a prescribed value, the switch 12 is operated to open the on-off valve 13. Therefore, the air is for the first time supplied through the pipes 8, 14 and the on-off valve 13 and from the pipe 15 to the air motor 34. Simultaneously, the driving device 2 stops its movement to the left owing to the partition wall 4 being brought into contact with a bush 50 of the right chamber 49. The air motor disposed in the dresser body is rotated due to the air pressure from the pipe 15 to cause the rotation of the dresser blade, and the timer 17 starts its measurement as the inlet pressure of the air motor reaches a reference value for enabling the motor to be normally rotated. Namely, the timer 17 starts its measurement for the first time when the air motor is normally rotated to permit dressing to be started.

When desired dressing is completed upon the lapse of desired time, the changeover valve 7 is changed by the timer 17 to thereby reach a position (c) via a neutral position (b). Due to the changeover of the changover valve 7 the pressure within the left chamber 47 is reduced and the pressure within the right chamber 49 is increased so that the driving device is moved to the right, and thereby the relative positional difference between the driving device and the dresser body is first made zero to permit the switch 12 to close the on-off valve 13 and then the driving device is moved to the right followed by the dresser body.

The movement keeps on until the blade 33 of the dresser body comes into contact with the right tip 51. Successively, the right tip 51 is subjected to the dressing (the operation is the same process as the dressing for the left tip).

With completion of the tip dressing, the changeover valve 7 is changed over by a control signal 45 from the timer 17 to be returned to the neutral positon (b) while the control valve 41 is opened by a control signal 46 from the timer 17.

Accordingly, the air in the chamber 49 is withdrawn and compressed air is forcedly inserted into cylinders 18, 19 and thereby both the piston rods 20, 21 are quickly thrust outwardly and the tip of the piston rod 21 pushes against the base 1 via the rubber 22. Owing to this reaction, the driving device 2 is quickly returned to the original center position. During this returning motion, the switch 12 forces the on-off valves 13 to be closed and then the driving device forces the dresser body to be moved therewith to the left.

According to the present invention, as described above, only changeover of the changeover valve to the position (a) causes air from the compressor to be supplied to the driving device while allowing succeeding operation to be automatically conducted. In addition, since the blade is not yet rotated when the tip is brought into contact with the blade of the dresser, the so called "grabbing chatter" is not produced on the tip and thus both the blade and tip are positioned in place for accurate dressing. Moreover, the timer is ready for measurement only during the time when the dressing is normally effected. Consequently, the degree of the dressing is not only kept at a prescribed level at all times, but in the movement of the driving device on the base, there is not produced a fear of the reaction being produced and thus the driving device can be smoothly moved. In addition, the driving device, upon being returned to the center of the base is quickly returned by the quick return mechanism provided therein. Moreover, the driving device is accurately brought to the center of the base with the aid of the operations of both the piston rods, so that the tip is properly taken out and the tip or the dresser body is prevented from being damaged. Thus, workability of the dressing can be sharply improved.

Although a certain preferred embodiment has been shown and described, it should be understood that many changes and modifications may be made therein without departing from the scope of the appended claims.

What is claimed is:

1. A dressing device for a tip of a welding gun, comprising:
    a base;
    a driving device movably provided on said base and being movable relative to the base from a nondressing position into a dressing position;
    dresser means movably supported on said driving device for movement with said driving device and relative to said base, said dresser means being movable relative to said driving device along a direction which is generally parallel to the direction of relative movement between said driving device and said base;
    said dresser means including rotatable blade means for dressing said tip and air motor means for effecting rotation of said blade means;
    on-off valve means for controlling flow of air to said air motor means;
    control switch means coacting between said driving device and a body of said dresser means for controlling the actuation of said on-off valve means;
    timer circuitry means responsive to pressure supplied to said air motor means for controlling the duration of the dressing operation when the blade means is rotatably engaged with the tip;
    changeover valve means for supplying air to said driving device to control movement thereof between said dressing and nondressing positions, said changeover valve means being connected to said timer circuitry means;
    a quick return mechanism mounted on said driving device and coacting with said base for effecting quick return of said driving device from said dressing position to said nondressing position, said quick return mechanism including pneumatic cylinder means; and
    control valve means for controlling flow of air to said pneumatic cylinder means, said control valve means being connected with said timer circuitry means.

2. A device according to claim 1, wherein said pneumatic cylinder means includes a cylinder mounted on said driving device and having a cylinder rod slidably supported therein and projecting outwardly therefrom, said cylinder rod having a tip end adapted to abuttingly engage said base when the driving device is in said dressing position so as to effect quick return of said driving device to said nondressing position in response to pressurization of said cylinder.

3. A device according to claim 1, wherein said driving device is movable relative to said base into first and second said dressing positions which are disposed on opposite sides of said nondressing position, said pneumatic cylinder means including a pair of cylinders mounted on said driving device and movably supporting a pair of piston rods which project outwardly in opposite directions from said driving device, said piston rods having free tip ends adapted to abuttingly contact said base, only one said tip end being in contact with said base when the cylinders are pressurized and the driving device is in one of said dressing positions for effecting quick return of said driving device to said non-dressing position.

* * * * *